United States Patent [19]

Eskuchen

[11] 4,395,030

[45] Jul. 26, 1983

[54] QUICK ACTION VISE

[75] Inventor: Frank G. Eskuchen, Coral Gables, Fla.

[73] Assignees: Leonard G. Eskuchen; Raymond F. Eskuchen; Wayne R. Lindholm, all of Palatine, Ill.

[21] Appl. No.: 345,196

[22] Filed: Feb. 2, 1982

[51] Int. Cl.[3] .................................... B23Q 3/02

[52] U.S. Cl. .................................... 269/181; 74/424.8 R

[58] Field of Search .................................... 269/181-183; 74/424.8 R, 424.8 A

[56] References Cited

U.S. PATENT DOCUMENTS

| | | | |
|---|---|---|---|
| 595,546 | 12/1887 | O'Brien | 269/181 |
| 825,151 | 7/1906 | McLean | 269/181 |
| 1,055,278 | 3/1913 | Hunt | 269/181 |
| 2,398,941 | 4/1946 | Jordan | 269/181 |
| 2,620,695 | 12/1952 | Eierman | 269/181 |
| 3,669,440 | 6/1972 | Kartasuk et al. | 269/181 |
| 4,002,328 | 1/1977 | Wolf et al. | 269/97 |

*Primary Examiner*—Robert C. Watson

*Attorney, Agent, or Firm*—Fitch, Even, Tabin & Flannery

[57] ABSTRACT

An improved vise includes a base, a journal housing, and fixed and movable clamping jaws. The housing includes passageways for a worm gear and a clutch means. By appropriate manipulation of a control for moving the movable jaw, an actuator within the housing may be rotated so as to effect the engagement and disengagement of the clutch means with the worm gear. When the clutch is engaged, the vise may be tightened in the usual manner of rotating the control. When the clutch is disengaged, the movable jaw may be moved quickly by the longitudinal movement of the control without rotation.

6 Claims, 6 Drawing Figures

QUICK ACTION VISE

BACKGROUND OF THE INVENTION

The present invention relates to vises, and more particularly to a quick action vise.

Many types of vises are known incorporating a fixed clamping jaw and a movable clamping jaw which is controlled by a control in the form of a rod incorporating a worm gear. Rotation of the control results in the movement of the movable jaw toward or away from the fixed jaw. The gear rotation permits manual effort to be readily translated into the considerable forces useful in clamping a workpiece between the jaws of the vise. However, the movement of movable jaw by rotation of the control is relatively slow. This slowness is inefficient for gross displacement of the movable jaw or the release of the workpiece.

Accordingly, some vises have included a clutch which disengages from the worm gear so that the movable jaw may be quickly displaced by longitudinal movements of the control. A disadvantage arises if a separate means is provided for actuating the clutch mechanism since it is desirable that one hand be available for manipulation of the control and another for supporting and handling the workpiece.

Some vises allow disengagement of the worm gear by a small, usually counterclockwise, movement of the control. Such a device is disclosed by Hunt in U.S. Pat. No. 1,055,278. A disadvantage of this and related vises is the complexity of the mechanisms that permit this one-handed control. Because of the complexity of the mechanisms provided, the resulting vises have proved relatively cumbersome, unreliable, unaesthetic and uneconomical. It is an object of the present invention to provide an improved quick action vise readily susceptible to one-handed operation.

SUMMARY OF THE INVENTION

A quick action vise provides for one-handed operation, freeing a second hand of a user for other purposes. Rotation of a control in one direction engages a clutch so that a movable clamping jaw may be driven toward a fixed clamping jaw by the continued rotation of the control. Rotation of the control in the opposite direction disengages the clutch so that subsequent longitudinal movement of the control provides for the gross movement of the movable jaw toward or away from the fixed jaw.

Means are provided for guiding the movement of the movable jaw. Accordingly, the movable jaw may be mounted upon parallel guide rods extending between the fixed jaw and a journal housing at opposite longitudinal ends of a base of the vise. The control is attached to the movable jaw, so that the movable jaw is responsive to the longitudinal movement of the control. The control may be freely rotated relative to the movable jaw. A worm gear of the control extends through a first passageway through the housing. The clutch extends into a second passageway in the housing, the second passageway communicating with the first passageway so that the clutch can engage the worm gear.

An actuator, which may be in the form of a sleeve with a detent, frictionally contacts the worm gear. The actuator may be urged clockwise or counterclockwise by rotation of the control. Turning the control so as to direct the movable jaw toward the fixed jaw moves the actuator to an engaging position, which motion urges the clutch to engage the worm gear. Upon such engagement, the control may be rotated so that the movable jaw approaches the fixed jaw to provide a clamping action. Turning the control in the opposite direction urges the actuator into a disengaging position, which in turn urges the clutch into a disengaged position. Upon such disengagement, the movable jaw may be moved by the longitudinal movement of the control without rotation. This provides for gross movement of the movable jaw and for the quick release of a workpiece clamped between the jaws.

Means are provided for limiting the rotation of the actuator. In one embodiment, upper and lower edge surfaces of a depression in the releasable clutch cooperate with the detent of an actuator sleeve to limit rotation of the sleeve in either rotational direction. The edge surfaces and the detent also cooperate to provide a linkage means so that the position of the clutch can be controlled by moving the actuator, which is in turn controlled by the control.

DESCRIPTION OF THE PREFERRED EMBODIMENTS

Figures 1, 2:
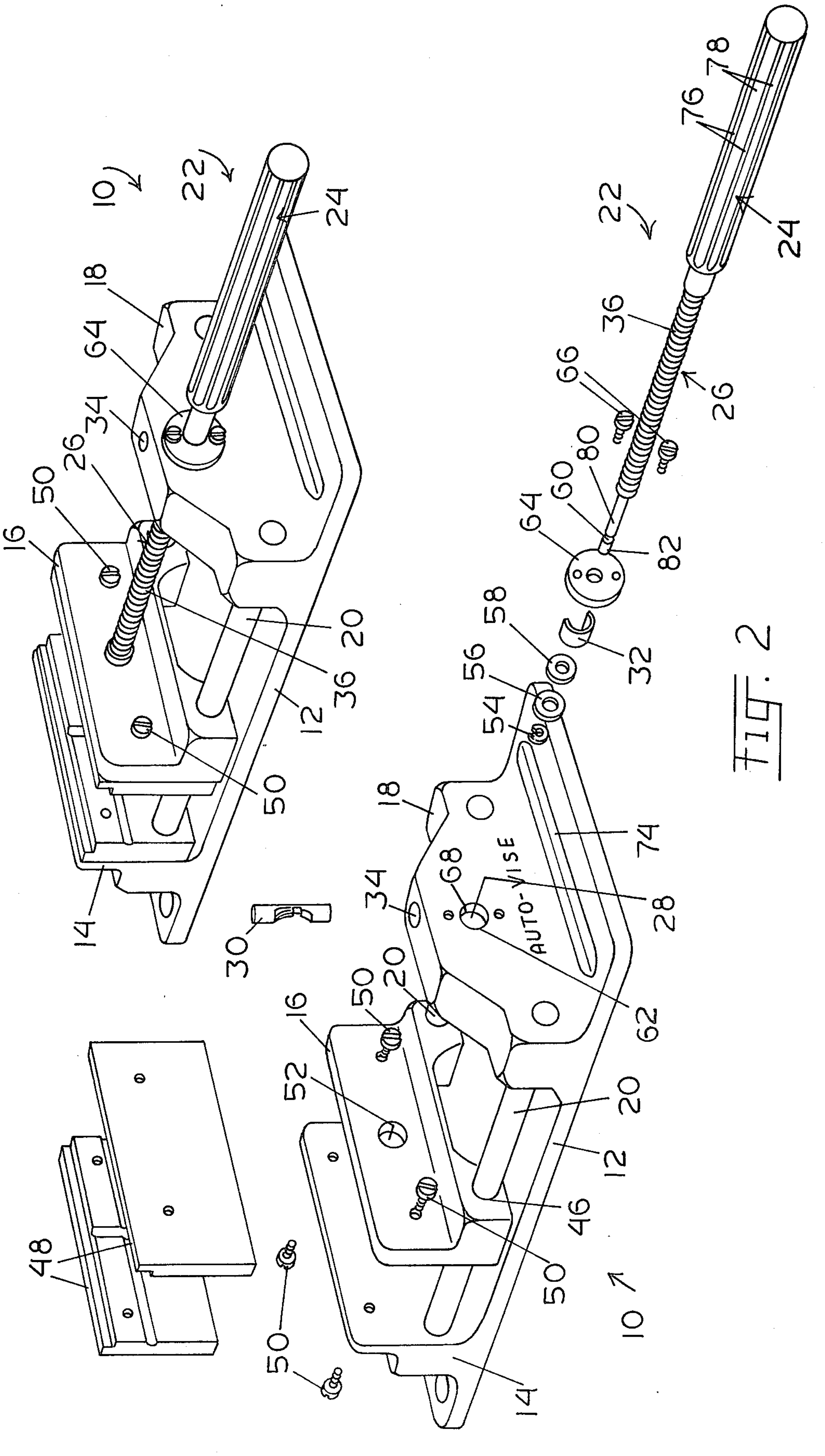
FIG. 1 is a perspective view of a vise in accordance with the present invention.
FIG. 2 is an exploded view of the vise of FIG. 1.
Figure 4:
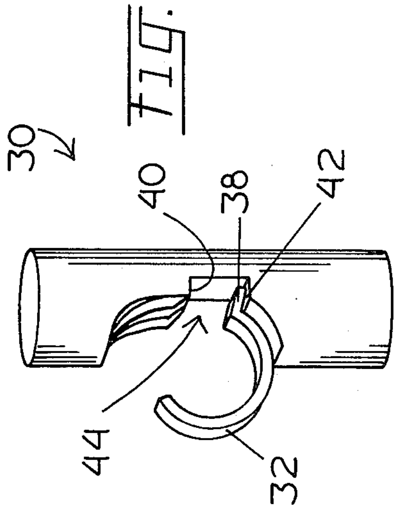
FIG. 4 is a perspective view of the actuator and the clutch of FIG. 3 in an engaging relationship.
Figure 6:
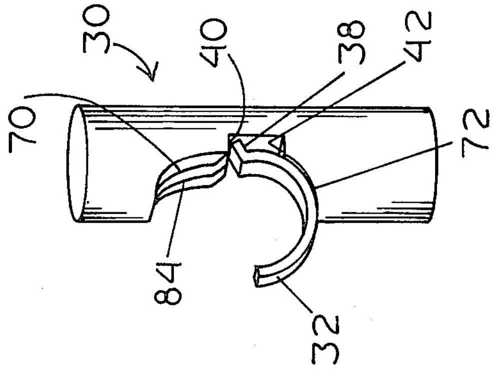
FIG. 6 is a perspective view of the actuator and the clutch of FIG. 3 in a disengaging relationship.
Figure 3:
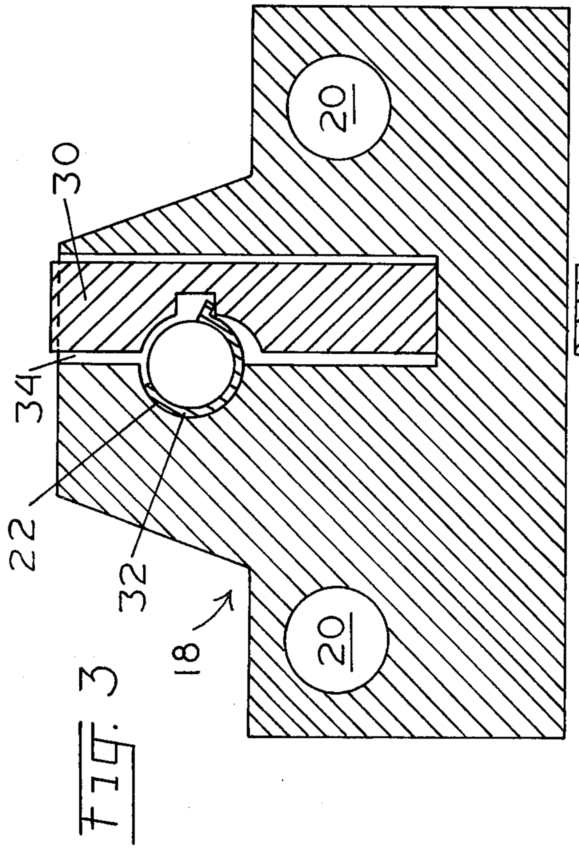
FIG. 3 is a rear elevational sectional view of a vise housing showing an actuator and a clutch in accordance with the present invention.
Figure 5:
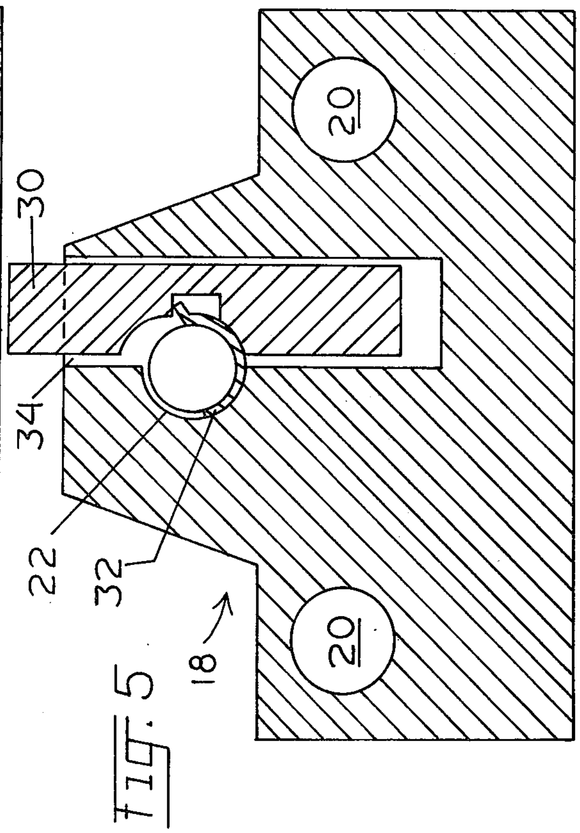
FIG. 5 is a rear elevational sectional view of the vise housing of FIG. 3 showing the actuator and the clutch in a disengaging relationship in accordance with the present invention.

A preferred vise 10 of the present invention comprises a base 12, a fixed clamping jaw 14, a movable clamping jaw 16 and an upstanding journal housing 18. The fixed jaw 14 and the housing 18 define front and rear longitudinal ends, respectively, of the base 12, with which they may be integral. The movable jaw 16 is supported between the housing 18 and the fixed jaw 14 by means such as parallel guide rods 20. A control rod or shaft 22 having a grip portion 24 and a worm gear portion 26 extends through a first bore or passageway 28 formed longitudinally, through the journal housing 18 and has its rearward end rotatably connected to the movable jaw 16. The control 22 and the movable jaw 16 are operatively connected so that longitudinal movement of the control rod 22 results in a corresponding longitudinal movement of the movable jaw 16.

In accordance with the present invention, a clutch 30 and an actuator 32 for engaging and disengaging the clutch 30 from the worm gear 26 are provided. The clutch 30 is situated in a second bore or passageway 34, which may be vertical in the journal housing. The passageway 34 is generally cylindrical and transversely intersects the longitudinal passageway 28 through which the worm gear portion 26 of the control rod 22 extends. The clutch 30 has a generally cylindrical configuration and is longitudinally slidable within passageway 34 between an engaged position and a disengaged position relative to the control rod 22. As will be described, when in its engaged position the clutch 30 meshes with the worm gear 26. When the clutch and worm gear are meshed, rotation of the control rod 22 results in longitudinal movement of the control rod 22 relative to the upstanding journal housing team and hence, the movable jaw 16. When in the disengaged position, the clutch 30 does not engage the threads 36 of the worm gear 26. Accordingly, the control 22 and the movable jaw 16 can be moved longitudinally without rotation of the control 22.

An actuator 32, preferably in the form of a metal arcuate shaped sleeve segment, frictionally contacts the outer peripheral surfaces of worm gear 26 and provides means cooperative with the control rod 22 and clutch 30 for urging the clutch 30 between its engaged and disengaged positions. For this purpose, the actuator 32 of the illustrated embodiment has a detent 38 which can engage an upper ledge 40 and a lower ledge 42 defined by a depression or generally rectangular recess 44 in the clutch 30.

When the control rod 22 is rotated in a first rotational direction, preferably clockwise as viewed from its gripping end 24, friction urges the actuator 32 in the same rotational direction. The detent 38 of the actuator 32 engages the lower ledge 42 of the clutch 30, forcing it downward and into engagement with the worm gear 26. The downward progress of the clutch 30 is halted by the bottom of the vertical passageway 34 so as to provide a limit to clockwise rotational movement of the actuator 32. However, the frictional contact between the actuator 32 and the control rod 22 is not so great as to significantly inhibit the continued rotation of the control rod 22. Such continued clockwise rotation of the worm gear 26 forces the control 22, and hence the movable jaw 16, toward the fixed jaw 14. This action permits the clamping of a workpiece situated between the jaws.

Rotation of the actuator 32 in a second or reverse rotational direction, such as counterclockwise, is induced frictionally by a like rotation of the control rod 22. The detent 38 is thereby urged into its disengaging position against the upper ledge 40 of the clutch 30 driving it upward into its disengaged position relative to the control rod. With the clutch 30 disengaged from the worm gear 26, the control rod 22 and the movable jaw 16 may be moved longitudinally without rotation of the control rod. This permits gross adjustment of the vise 10 and quick release of a workpiece.

Further counterclockwise rotation may cause the detent 38 to escape the depression 44 in the clutch 30. Gravity may urge the clutch 30 into engagement. In the illustrated embodiment, a one quarter turn counterclockwise is appropriate for disengagement.

Describing the illustrated embodiment in greater detail, the base 12, the fixed jaw 14 and the housing 18 are integrally cast aluminum. Parallel guide rods 20 extend from the lateral portions of the housing 18 to the fixed jaw 14. The rods 20 extend through longitudinally extending lateral holes 46 in the movable jaw 16 so that its movement is restricted to a linear path between the housing 18 and the fixed jaw. Jaw plates 48 are attached by bolts 50 to each of the jaws to provide better frictional engagement of the jaws with a workpiece.

The end of control rod 22 opposite the grip end 24 protrudes through a relatively central hole 52 in the movable jaw 16 to which the control rod 22 is attached by means of a retaining clip 54 and washers 56 and 58. The washers 56 and 58 are disposed on opposite sides of the movable jaw 16 and have diameters greater than that of the central hole 52 so they cannot pass therethrough. The front washer 56 is held in place by the movable jaw 16 and a retaining clip 54 disposed in a groove 60 at the front end of the control rod 22. The rear washer 58 is held in place by the movable jaw 16 and the worm gear 26 which has a diameter greater than the inner diameter of the rear washer 58.

The rear opening 62 to the longitudinal passageway 28 in the housing 18 is large enough to permit the insertion of the arcuate actuator 32. A cover plate 64, which may be attached to the journal rear of the housing 18 with bolts 66, maintains the actuator 32 within the longitudinal passageway 28 during normal use of the vise 10. The front opening 68 of the longitudinal passageway 28 has a diameter only slightly greater than that of the worm gear 26, so that the actuator 32 is prevented from passing therethrough under normal conditions.

The clutch 30 extends through the vertical passageway 34 in the housing 18. The depression 44 bridges upper and lower arcuate surface portions 70 and 72 of the clutch 30. The upper arcuate surface portion 70 has a thread segment formed therein adapted for complimentary engagement with the worm gear 26. The lower arcute surface portion 72 is smooth so as to be unable to significantly engage the worm gear 26. The horizontal cross section of the clutch 30 is generally cylindrical to conform to that of the vertical passageway 34. The dimensions of the upper and lower ledges 40 and 42 are sufficient to engage the detent 38 of the actuator 32.

The actuator 32 is designed to frictionally contact the worm gear 26. The actuator 32 is generally C-shaped so that it can be compressed during insertion into the longitudinal passageway 28. The radius of curvature of the arcuately shaped actuator 32 is approximately equal to one-half the outer diameter of the worm gear 26. The length of the detent 38 is on the order of the depth of the ledges 40 and 42 of the clutch 30. The angle of the detent 38 is such that it is firmly engaged by the lower ledge 42 of the clutch 30 upon clockwise rotation of the control rod 22 and such that it is tenuously engaged by the upper ledge 40 upon counterclockwise rotation of the control rod 22. Thus, continued clockwise rotation of the control rod 22 results in continued engagement of the worm gear 36 with clutch 30 so as to effect progression of the movable jaw 16 toward the fixed jaw 14.

Selected components and dimensions are further detailed below. The base 12 may be about 9.5" by 3.75". Slots 74 at either end and along the longitudinal passageway 28 median of the base 12 provide for the mounting of the base 12 to a work table, etc. The housing 18 and the fixed jaw 14 extend to within about 1.0" of their respective ends of the base 12. The base 12 spans about 5.75" between the fixed jaw 14 and the housing 18.

The overall length of the control 22 is about 8.84", of which 3.0" is dedicated to the grip 24, 5.25" to the worm gear 26, and 0.59" to an assembly end. The grip 24 is generally cylindrical and has a diameter of 0.812". Eight radially spaced longitudinal grooves 76, 0.07" in diameter, and medium diamond knurl on the intermittent land surfaces 78 provide for comfortable and secure contact between the hand of a human operator and the grip 24. The worm gear 26 has a $\frac{1}{2}$-10 2G ACME right-hand thread and has a diameter of 0.625". The assembly end includes the groove 60 for the retaining clip 54 with a diameter of 0.210" and a width of 0.040".

The groove 60 separates a cylindrical barrel 80 which is about 0.5" long, from a tip 82, which is 0.062" long. The barrel 80 and tip 22 each have a diameter of 0.290". The common diameter of the barrel 80 and tip 82 is approximately equal to the inner diameters of the washers 56 and 58. The tip 82 is slightly beveled at its front so as to facilitate insertion through the washers 56 and 58 and the movable jaw 16. The length of the barrel 80 is sufficient to accommodate the central hole 52 of the movable jaw 16 and the washers 56 and 58 on either side of the movable jaw 16. The groove 60 provides a secure seat for the retaining clip 54 which locks the front washer 56 against the movable jaw 16. The diameter of the worm gear 26 is greater than the inner diameter of the washers 56 and 58, so that the rear washer 58 is bound between the worm gear 26 and the rear side of the movable jaw 16.

The unstressed inner diameter of the actuator 32 is about 0.43". The actuator 32 subtends a 270° arc, with the detent 38 at one extremity. The actuator 32 may thus be compressed to facilitate insertion into the longitudinal passageway 28 of the housing 18. The detent 38 extends about 0.0625" from the outer surface of the arc. The longitudinal extent of the illustrated actuator 32 is about 0.5".

The central hole 52 of the movable jaw 16, the front opening 68 in the housing 18, the actuator 32, and the lower arcate portion 72 of the clutch 30 must generally conform to the worm gear 26, and their dimensions are selected accordingly. The actuator 32 is of spring steel so that its operational diameter can be and is greater than its unstressed diameter. The restoring forces of the actuator 32 insure its frictional contact with the worm gear 26.

The illustrated clutch 30 is 0.50" in diameter and 1.73" high. The lower, threaded, arcuate portion extends from about 0.31" to about 0.78" above the base 12 of the clutch 30. The lower, threaded portion includes four thread segments 84 adapted for engaging the threads 36 of the worm gear 26. The depression 44 is about 0.25" high, and a wall 86 of the depression 44 is located about 0.165" from a line radially outward of the depression 44 and on the outer surface of the clutch 30. The upper arcuate portion 70 has a radius of curvature of about 0.28" and extends to about 0.56" of the top of the clutch 30.

The clutch 30 is situated, at least partially, within the vertical passageway 34, which has dimensions comparable to the diameter and height of the clutch 30. The position of the clutch 30 relative to the worm gear 26 is selected so that the action of the detent 38 can effect their engagement and disengagement. Accordingly, the vertical passageway 34 is offset relative to the longitudinal passageway 28. More particularly, the axis of each passageway 28, 34 is roughly tangent to the other passageway 34, 28. This arrangement permits the clutch 30 to partially surround the worm gear 26. One effect of this positional reltionship of the worm gear 26 and the clutch 30 is that the clutch 30 cannot be removed from the vertical passageway 34 as long as the worm gear 26 is in place. This interlocking arrangement permits ready engagement of the clutch 30 by the detent 38 of the actuator 32 and ready engagement and disengagement of the worm gear by vertical displacement of the clutch 30. This interlocking also reduces the chances that the vise 10 may be rendered inoperative by loss of the clutch 30.

It is apparent the present invention encompasses other embodiments. Clearly, the dimensions set forth above can be changed in a coordinated fashion to provide a variety of useful vises for various workpieces and applications. Many structural variations are also permissible within the spirit and scope of the present invention.

What is claimed is:

1. A quick action vise comprising:

a base defining a longitudinal axis and including a generally upstanding portion;

a first clamping jaw fixedly secured to said base in spaced relation to said upstanding portion;

a second clamping jaw;

means cooperative with said base for supporting said second clamping jaw for movement along a predetermined path relative to said first clamping jaw between a position spaced therefrom and a position cooperative with said first clamping jaw to facilitate support of a work piece therebetween;

said generally upstanding portion of said base having a first bore therethrough the axis of which is substantially parallel to said predetermined path, and having a second bore therein transverse to and intersecting said first bore:

a control rod extending through said first bore and being rotatable relative to said base, said control rod being operatively connected to said second clamping jaw so as to effect movement of said second clamping jaw relative to said first clamping jaw upon longitudinal movement of said control rod;

a clutch member disposed within said second bore and longitudinally moveable therein to a first position engaging said control rod so as to effect positive longitudinal movement of said control rod in a first direction relative to said base upon rotation of said control rod in a first rotational direction, said clutch member being movable to a second position in response to rotation of said control rod in an opposite rotational direction such that said clutch member enables longitudinal movement of said control rod in a direction opposite to said first longitudinal direction while maintained in relatively fixed rotational relation to said base; and a sleeve-like actuator frictionally cooperative with said control rod and operatively associated with said clutch member so as to effect longitudinal movement of said clutch member between its said first and second positions in response to selective rotational movement of said control rod in said first and second rotational directions, movement of said clutch member to its said second position enabling rapid movement of said second jaw relative to said first jaw without rotating said actuator rod.

2. A quick action vise as defined in claim 1 wherein said control rod has a worm gear formed thereon, said clutch member having a thread segment formed thereon cooperative with said worm gear so as to effect threaded engagement between said control rod and said clutch member when in its said first position, said clutch member when in its said second position being disengaged from said worm gear in a manner to enable said reverse longitudinal movement of said control rod relative to said base without rotating said control rod.

3. A quick action vise as defined in claim 1 wherein said actuator comprises an arcuate shaped member disposed within said first bore in concentric relation with said control rod, said clutch member having a recess therein defining ledge surfaces, said actuator having a detent extending within said recess and adapted for engagement with said ledge surfaces during rotation of said control rod in a manner to effect movement of said clutch member between its said first and second positions upon selective rotation of said control rod.

4. A quick action vise as defined in claim 1 wherein said second bore has a substantially cylindrical configuration, said clutch member having a substantially cylindrical configuration and being longitudinally slidable within said second bore.

5. A quick action vise as defined in claim 3 wherein said second bore is cooperative with said clutch member so as to limit movement thereof to its said second second position upon rotation of said control rod in its said opposite rotational direction.

6. A quick action vise comprising:

a base having front and rear longitudinal ends;

a fixed jaw attached to said front end and extending upwardly therefrom;

a journal housing attached to said rear end, said housing extending upwardly from said base to a top of said housing, said housing having a substantially longitudinal passageway extending completely therethrough and a substantially vertical passageway extending to said top of said housing and communicating with said longitudinal passageway;

a movable jaw movably situated between said fixed jaw and said journal housing;

guide rods for guiding and supporting said movable jaw, said rods extending through said movable jaw and from said housing to said fixed jaw;

a control, including a grip and a worm gear, said control extending through said longitudinal passageway of said housing, said work end of said control being adjacent said movable jaw, said worm gear having threads oriented so that clockwise rotation of said control moves said control toward said fixed jaw when said worm gear is engaged;

attachment means for attaching said control to said movable jaw so that said movable jaw can respond to longitudinal movement of said control, said attachment means permitting rotational movement of said control relative to said movable jaw;

a clutch situated within said vertical passageway of said housing, said clutch having a depression therein with an upper and a lower ledge, said clutch being vertically displaceable between an engaged position and a disengaged position within said vertical passageway, said clutch when in said engaged position being engaged with said worm gear so that rotation of the control results in longitudinal movement of said movable jaw, said clutch when in said disengaged position being disengaged from said worm gear so that said movable jaw may be moved longitudinally by the longitudinal movement of said control without rotation of said control; and an actuator in the form of a sleeve with a detent for controlling the position of said clutch, said actuator being in frictional engagement with said worm gear, said actuator having an engaging and a disengaging position, said upper ledge cooperating with said detent to urge said clutch into its disengaged position as said actuator achieves its disengaging position, said lower ledge cooperating with said detent to urge said clutch into its engaged position as said actuator achieves its engaging position and also to limit the rotation of said actuator to said engaging position when said control is rotated clockwise, whereby, when said control is rotated in clockwise, said actuator is urged to its engaging position and said clutch to its engaging position so that said movable jaw moves toward said fixed jaw, and when said control is rotated counterclockwise said actuator is urged to its disengaging position and said clutch to its disengaged position so that said movable jaw may be moved by the longitudinal movement of said control without rotation of said control.

* * * * *